(12) United States Patent
Zhen et al.

(10) Patent No.: US 12,234,108 B2
(45) Date of Patent: Feb. 25, 2025

(54) SUCTION GUN AND MATERIAL SUCTION DEVICE

(71) Applicant: CONTEMPORARY AMPEREX TECHNOLOGY (HONG KONG) LIMITED, Hong Kong (CN)

(72) Inventors: Zhihui Zhen, Ningde (CN); Tao Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 82 days.

(21) Appl. No.: 18/315,491

(22) Filed: May 10, 2023

(65) Prior Publication Data
US 2023/0278812 A1    Sep. 7, 2023

Related U.S. Application Data

(63) Continuation of application No. PCT/CN2022/100412, filed on Jun. 22, 2022.

(30) Foreign Application Priority Data

Sep. 28, 2021   (CN) .......................... 202122391754.2

(51) Int. Cl.
*B65G 53/42* (2006.01)
*B65B 69/00* (2006.01)
(Continued)

(52) U.S. Cl.
CPC .......... *B65G 53/42* (2013.01); *B65B 69/0008* (2013.01); *B65G 53/24* (2013.01); *B65G 53/28* (2013.01); *B65G 2201/04* (2013.01)

(58) Field of Classification Search
None
See application file for complete search history.

(56) References Cited

U.S. PATENT DOCUMENTS 2,301,617 A * 11/1942 Cox ........................ B65G 53/42
                                                                  406/152
2,744,792 A *  5/1956 Finn ....................... B65G 53/42
                                                                   406/48
(Continued)

FOREIGN PATENT DOCUMENTS

CN        203726713 U     7/2014
CN        105668243 A     6/2016
(Continued)

OTHER PUBLICATIONS

The World Intellectual Property Organization (WIPO) International Search Report for PCT/CN2022/100412 Sep. 27, 2022 8 pages (including English translation).
(Continued)

*Primary Examiner* — Joseph A Dillon, Jr.
(74) *Attorney, Agent, or Firm* — Anova Law Group, PLLC

(57) ABSTRACT

A suction gun includes a gun head is provided with a material suction port configured to suck a material located in an area for sucking, and an air blowing structure including an air blowing pipe and an air blowing hole provided on a pipe wall of the air blowing pipe. The air blowing hole is configured to blow an air flow so as to blow the material to the material suction port.

13 Claims, 3 Drawing Sheets

(51) Int. Cl.
  *B65G 53/24* (2006.01)
  *B65G 53/28* (2006.01)

(56) References Cited

U.S. PATENT DOCUMENTS

| | | | | |
|---|---|---|---|---|
| 3,118,474 | A * | 1/1964 | Eppolito | B65B 1/18 |
| | | | | 141/285 |
| 3,638,741 | A * | 2/1972 | Zizak | E21B 7/18 |
| | | | | 175/215 |
| 4,182,386 | A * | 1/1980 | Alack | B65G 69/182 |
| | | | | 141/93 |
| 4,471,820 | A * | 9/1984 | Lepisto | B65B 1/18 |
| | | | | 141/10 |
| 4,527,716 | A * | 7/1985 | Haas | B65G 65/40 |
| | | | | 414/412 |
| 4,538,941 | A * | 9/1985 | Thorne | B65G 53/42 |
| | | | | 406/143 |
| 4,569,160 | A * | 2/1986 | Hengesbach | B24C 3/06 |
| | | | | 451/99 |
| 4,812,086 | A * | 3/1989 | Kopernicky | B65G 53/42 |
| | | | | 406/114 |
| 5,037,246 | A * | 8/1991 | Okano | B65G 53/42 |
| | | | | 406/152 |
| 5,195,852 | A * | 3/1993 | Malugani | B65G 53/42 |
| | | | | 406/41 |
| 5,248,429 | A * | 9/1993 | Larsen | B65B 69/00 |
| | | | | 141/7 |
| 5,474,111 | A * | 12/1995 | Williamson | B65G 53/26 |
| | | | | 141/330 |
| 5,746,347 | A | 5/1998 | Riedemann et al. | |
| 6,036,408 | A * | 3/2000 | Wilhelm | B65G 53/24 |
| | | | | 406/134 |
| 6,254,315 | B1 * | 7/2001 | Pfeiffer | B65G 53/14 |
| | | | | 406/117 |
| 6,352,393 | B1 * | 3/2002 | Sanders | E02F 3/9212 |
| | | | | 175/215 |
| 6,368,028 | B1 * | 4/2002 | Nester | B65G 53/58 |
| | | | | 406/194 |
| 6,375,039 | B1 * | 4/2002 | Anderson | B65G 53/42 |
| | | | | 222/196 |
| 6,398,462 | B1 * | 6/2002 | Fulkerson | B05B 7/1472 |
| | | | | 406/75 |
| 6,588,988 | B2 * | 7/2003 | Zlotos | B65G 53/24 |
| | | | | 406/14 |
| 6,702,523 | B1 * | 3/2004 | Docheff, III | B65G 53/14 |
| | | | | 406/197 |
| 6,979,152 | B2 * | 12/2005 | Bodie | B65G 53/42 |
| | | | | 37/318 |
| 6,979,166 | B2 * | 12/2005 | Ours | B65B 69/0075 |
| | | | | 406/114 |
| 7,188,749 | B2 * | 3/2007 | Miller | B65D 77/06 |
| | | | | 222/105 |
| 7,311,474 | B1 * | 12/2007 | Ogasahara | B65G 53/14 |
| | | | | 406/146 |
| 7,708,504 | B2 * | 5/2010 | Heckendorn | B65G 53/14 |
| | | | | 406/151 |
| 8,307,859 | B2 * | 11/2012 | Jordan | B01J 8/18 |
| | | | | 141/369 |
| 9,446,362 | B2 * | 9/2016 | Stander | B65G 53/42 |
| 9,637,320 | B2 * | 5/2017 | Moretto | B65G 53/04 |
| 9,731,914 | B2 * | 8/2017 | Rasner | B65G 53/66 |
| 9,994,403 | B2 * | 6/2018 | Logan | F16L 11/12 |
| 10,017,332 | B2 * | 7/2018 | Carteri | B65G 53/24 |
| 10,412,879 | B2 * | 9/2019 | Cruson | B65G 53/58 |
| 11,174,111 | B2 * | 11/2021 | Walker | B65G 53/24 |
| 11,407,599 | B2 * | 8/2022 | Reich | B65G 53/42 |
| 11,608,234 | B2 * | 3/2023 | Pino, Jr. | F16L 55/00 |
| 12,084,267 | B2 * | 9/2024 | Schinasi | B65D 88/548 |
| 2006/0062639 | A1 * | 3/2006 | Dietrich | B65G 53/42 |
| | | | | 406/86 |
| 2020/0346877 | A1 * | 11/2020 | Walker | B65G 53/42 |
| 2022/0177239 | A1 * | 6/2022 | Walker | B65G 53/24 |

FOREIGN PATENT DOCUMENTS

| | | | | |
|---|---|---|---|---|
| CN | 206492751 | U | | 9/2017 |
| CN | 207434565 | U | | 6/2018 |
| CN | 210820025 | U | | 6/2020 |
| CN | 211870758 | U | | 11/2020 |
| CN | 213140599 | U | | 5/2021 |
| CN | 213651188 | U | | 7/2021 |
| DE | 3509166 | A | * | 10/1985 ............ B65G 53/42 |
| DE | 202015107034 | U1 | | 1/2016 |
| DE | 102014012236 | A1 | | 2/2016 |
| JP | 6491972 | B2 | | 3/2019 |

OTHER PUBLICATIONS

The European Patent Office (EPO) The Extended European Search Report for Application No. 22874312.6, May 6, 2024 7 Pages.

* cited by examiner

SUCTION GUN AND MATERIAL SUCTION DEVICE

CROSS-REFERENCE TO RELATED APPLICATIONS

The present application is a continuation of International Application No. PCT/CN2022/100412, filed on Jun. 22, 2022, which claims priority to Chinese patent application no. 202122391754.2, filed on Sep. 28, 2021 and entitled "SUCTION GUN AND MATERIAL SUCTION DEVICE", which are incorporated herein by reference in their entirety.

TECHNICAL FIELD

The present application relates to the technical field of material suction apparatuses, and particularly relates to a suction gun and a material suction device.

BACKGROUND ART

In a manufacturing process of products, materials required for processing need to be transported to designated positions for processing. Usually, workers put the materials in carriers such as material bags or boxes, so as to facilitate loading and unloading before and after transportation. After a carrier containing the materials reaches a designated position, the materials contained in the carrier are taken out and transferred to a processing position for further processing.

Materials may be solid or liquid. Different forms of materials are suitable for different containing ways, and different taking ways during unloading. For example, liquid can be placed in a plastic container, a glass container, or a metal container. If the liquid is corrosive, corrosion resistance of the container should be also considered. When the liquid is taken out, it usually flows out through a pipeline. With solid as an example, if the solid is a large block, it can be placed in a meshed material bag or meshed box. However, if the solid is a small solid particle, it needs to be placed in a dense material bag or box so as to prevent leakage of solid particles. The solid is usually taken out through pinching or dumping.

However, during unloading, small solid particles are easily left in folds of the material bags or gaps of the boxes, which not only wastes the materials and increases the cost, but may also causes environmental pollution and harm to human health when the materials left in the material bags or boxes enter an environment. Therefore, no matter from the perspective of environmental protection or human health, or from the perspective of saving resources, it is necessary to solve the problem that the materials are left in the material bags or boxes at the end of unloading as soon as possible.

SUMMARY

In view of the above problems, embodiments of the present application provide a suction gun and a material suction device, which may suck materials from a plurality of positions and angles, and effectively reduce materials left in material bags or boxes at the end of unloading.

According to an aspect of the embodiments of the present application, there is provided a suction gun. The suction gun includes:

a gun head, where the gun head is provided with material suction ports, and the material suction ports are configured to suck materials located in an area for sucking; and an air blowing structure including an air blowing pipe and air blowing holes provided on a pipe wall of the air blowing pipe, where the air blowing holes are configured to blow air flows so as to blow the materials to the material suction ports.

According to the solution, the suction gun is placed in the area for sucking, and the suction gun sucks materials close to the material suction ports. During material suction of the suction gun, the air blowing structure blows the materials to the material suction ports, materials away from the material suction ports or at angles from which the material suction ports inconveniently suck materials may be transferred to an area where the material suction ports easily suck the materials, and the material suction ports conveniently suck the materials, such that a wider range of materials may be sucked, so as to reduce materials being left in the material bags or boxes at the end of unloading.

In some embodiments, the air blowing pipe is connected to the gun head.

According to the solution, relative positions of the air blowing pipe and the gun head are fixed, such that the air blowing pipe may automatically move along with the movement of the gun head, time for adjusting a position of the air blowing pipe when the gun head sucks the materials is saved, then the materials are sucked faster, and material suction efficiency is improved.

In some embodiments, the pipe wall of the air blowing pipe surrounds the gun head, and the air blowing holes are located at one side of the air blowing pipe close to the material suction ports.

According to the solution, the air flows blown from the air blowing holes may be closer to the material suction ports, and since air pressure of an air flow passing area may increase, when a distance between the air flow passing area and the material suction ports is short, due to an air pressure difference between two positions, the materials may automatically move from the air flow passing area to the material suction ports, such that the materials may be sucked by the suction gun from the material suction ports. With the arrangement, the air blowing holes may blow the materials toward the material suction ports more efficiently, such that an air blowing effect is better, the materials that are far away or inconvenient to suck are sucked into the suction gun, and the materials left at the end of unloading are reduced.

In some embodiments, the gun head has an axis, there are a plurality of material suction ports, and the plurality of material suction ports are provided around the axis of the gun head so as to suck the materials from a plurality of positions.

According to the solution, the materials at various positions around the gun head may be sucked, and different material suction ports are used to suck the materials from different angles, which may allow the suction gun to suck the materials at more positions, so as to reduce the materials left at the end of unloading; and moreover, simultaneous suction of the plurality of material suction ports may further increase a material flow rate in unit time and improve the material suction efficiency.

In some embodiments, the material suction ports are fixedly provided with filter screens, and the filter screens are provided with mesh holes to filter the materials.

According to the solution, the sucked materials may be further filtered to prevent unqualified materials or other foreign matters from entering the material suction ports and ensure the purity of the sucked materials.

In some embodiments, the air blowing pipe and the gun head are coaxially arranged, and a plurality of air blowing holes are provided at intervals around an axis of the gun head, so as to blow the materials to the material suction ports from a plurality of positions.

According to the solution, the materials at a plurality of positions around the gun head may be blown to the material suction ports through different air blowing holes, such that the material suction ports may be ensured to suck more materials around the gun head, so as to reduce the materials left.

In some embodiments, there is a second included angle between an axis of each air blowing hole and an axis of the gun head, and an angle value of the second included angle is 60 degrees to 67.5 degrees, such that the accuracy of blowing the materials to the material suction ports is improved.

If the second included angle is too large, the materials may be blown away from the material suction ports; and if the second included angle is too small, the materials close to the material suction ports may be easily blown away, and it may be difficult to blow the materials to the material suction ports. Therefore, the angle value of the second included angle is set as 60 degrees to 67.5 degrees. According to the solution, in air blowing directions, the air blowing holes may be ensured to better blow the materials to the material suction ports, such that the material suction efficiency is improved.

In some embodiments, the gun head is a cone or pyramid having a hollow structure, such that a tip of the gun head is used to pierce a material bag containing the materials.

According to the solution, the gun head may be used to directly pierce a material bag containing the materials, such that a step of opening the material bag before the gun head sucks the materials is omitted. In addition, an own structure of the gun head is used to pierce the material bag, and a size of an opening may be ensured to match a size of the gun head, such that a step of determining the size of the opening according to the size of the gun head is omitted, and leakage of the materials at the opening is avoided.

In some embodiments, the material suction ports are provided on a conical surface of the cone or the pyramid, and the material suction ports are not provided at the tip of the gun head so as to increase sharpness of the tip.

According to the solution, in a process of piercing the material bag, a contact area between a top of the gun head and the material bag may be reduced, such that the gun head has a higher pressure intensity under the condition of the same force, and the material bag may be successfully pierced with a smaller force.

In some embodiments, an angle value of a vertex angle of the cone or the pyramid is 30 degrees to 60 degrees, such that sharpness of the tip is kept, and an area of a material suction area formed by the material suction ports is increased.

According to the solution, too large a vertex angle may reduce the sharpness of the tip while too small a vertex angle may lead to too small an area of the material suction area, causing difficulties in material suction. Therefore, the angle range is selected, and the sharpness of the tip and the area of the material suction area are considered at the same time, so as to achieve balance therebetween, such that the area of the material suction area may be ensured while the tip of the gun head may be sharp enough to pierce the material bag, and the material suction efficiency is ensured.

In some embodiments, the angle value of the vertex angle is 45 degrees.

According to the solution, the area of the material suction area on the gun head may be maximized, such that the material suction efficiency is maximized, and meanwhile, the sharpness of the gun head is also ensured, and then it is ensured that the material bag may be successfully pierced with a smaller force.

According to another aspect of the embodiments of the present application, there is provided a material suction device. The material suction device includes:

a suction gun according to any one of the embodiments in a first aspect;

a telescopic device, where the telescopic device is configured to control the suction gun to move, such that the suction gun moves close to materials; and an air supplementing device, where the air supplementing device is configured to feed gas into an air blowing pipe of the suction gun.

According to the solution, the telescopic device may control the suction gun to move close to the materials at the beginning of material suction and move away from the materials at the end of material suction. In addition, the suction gun may be further controlled to expand and contract accordingly in a material suction process, so as to suck the materials from proper positions, and the air supplementing device feeds gas into the air blowing pipe in the material suction process, so as to blow out air flows from the air blowing holes and blow the materials to the material suction ports of the gun head, thereby ensuring that the materials are sucked by the material suction ports, and the materials left are reduced while the material suction efficiency is improved.

In some embodiments, the material suction device further includes:

an air pressure control device, where the air pressure control device is configured to control air pressure inside the suction gun to be lower than air pressure outside the suction gun, such that the materials outside the suction gun are sucked into the suction gun from the material suction ports.

According to the solution, an air pressure difference between inside and outside of the suction gun may be enhanced, and the materials outside the suction gun may be sucked into the suction gun, such that a material suction effect is ensured, and the materials left are reduced.

According to the embodiments of the present application, the air blowing structure is provided on the gun head of the suction gun, air is blown through the air blowing holes of the air blowing structure, air pressure close to generated air flows is higher than air pressure of the material suction ports, and the materials close to the suction gun are moved to the material suction ports, such that a material suction range of the material suction ports is expanded, and the materials left at the end of unloading are reduced. In addition, the air flows blown from the air blowing holes may transfer materials away from the material suction ports or at angles from which the material suction ports inconveniently suck materials to an area where the material suction ports easily suck the materials, and the material suction ports conveniently suck the materials, such that the materials left in the material bags or boxes at the end of unloading are further reduced.

The aforementioned description is merely an overview of the technical solutions of the embodiments of the present application. In order to more clearly understand the technical means of the embodiments of the present application to implement the technical means according to the content of the description, and in order to make the above and other objectives, features and advantages of the embodiments of the present application more obvious and understandable, specific implementations of the present application are illustratively described below.

BRIEF DESCRIPTION OF THE DRAWINGS

In order to more clearly illustrate the technical solutions in the embodiments of the present application, the drawings to be used in the description of the embodiments will be described briefly below. Obviously, the drawings in the following description are merely some embodiments of the present application. For those of ordinary skill in the art, other drawings can also be obtained according to these drawings without creative efforts.

Figure 1:
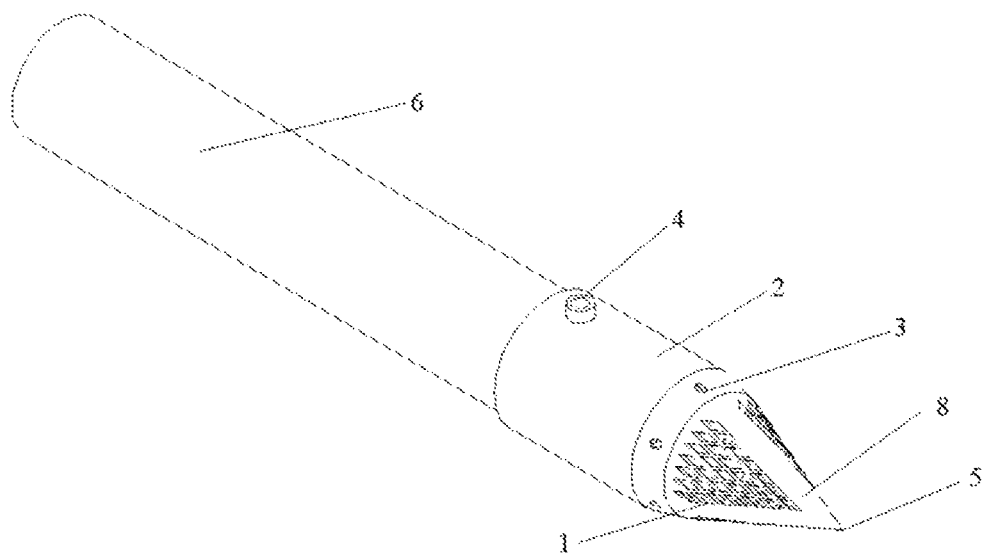
FIG. 1 is a schematic structural diagram of a suction gun provided in an embodiment of the present application from a first perspective.

List of reference signs: 1. Material suction port; 2. Air blowing pipe; 3. Air blowing hole; 4. Air inlet; 5. Vertex angle; 6. Pipeline; 7. Material bag; 8. Supporting area; a. Second included angle; b. First angle.

DETAILED DESCRIPTION OF EMBODIMENTS

In order to make the objectives, technical solutions and advantages of embodiments of the present application clearer, the technical solutions in the embodiments of the present application will be described clearly and completely below with reference to the accompanying drawings in the embodiments of the present application. Obviously, the embodiments described are some rather than all embodiments of the present application. All other embodiments obtained by those of ordinary skill in the art on the basis of the embodiments of the present application without creative efforts shall fall within the scope of protection of the present application.

Unless otherwise defined, all technical and scientific terms used herein have the same meanings as those commonly understood by those skilled in the art to which the present application belongs. The terms used in the description of the present application are merely for the purpose of describing specific embodiments, and are not intended to limit the present application.

The terms "include/comprise" and "have" in the description, claims and drawings of the present application and any variations thereof are intended to cover and not exclude other contents. The word "a/an" or "one" does not exclude existence of multiple.

The phrase "embodiment" mentioned herein means that the specific features, structures, or characteristics described in conjunction with the embodiment can be encompassed in at least one embodiment of the present application. The phrase "embodiment" in various places in the description does not necessarily refer to the same embodiment, nor is it an independent or alternative embodiment exclusive of other embodiments. Those skilled in the art understand explicitly or implicitly that the embodiment described herein can be combined with another embodiment.

The term "and/or" herein is merely the description of an associated relationship of associated objects, and indicates that three relationships may exist. For example, A and/or B can indicate three instances of A alone, A and B simultaneously, and B alone. In addition, the character "/" herein generally indicates an "or" relationship between the associated objects.

The orientation terms in the following description are orientations shown in the drawings and are not intended to limit a specific structure of a suction gun or a material suction device of the present application. For example, in the description of the present application, the orientation or positional relationships indicated by the terms "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or positional relationships shown in the accompanying drawings and are merely for ease of description of the present application and for simplicity of description, rather than indicating or implying that the device or element referred to must have a particular orientation or be constructed and operated in a particular orientation, and thus cannot be construed as a limitation on the present application.

In addition, expressions indicating directions, such as an X-direction, a Y-direction and a Z-direction, which are used to describe operations and configurations of various members of the suction gun and the material suction device of the embodiment are not absolute but relative, and although the indications are appropriate when various members of a battery pack are in positions shown in the figures, when the positions are changed, the directions should be interpreted differently to correspond to the changes.

In addition, the terms "first", "second", etc. in the description, claims, or the accompanying drawings of the present application are used for distinguishing different objects, instead of describing a specific order, and thus can explicitly or implicitly include one or more features.

In the description of the present application, unless otherwise stated, "a plurality of" means two or more (including two), and similarly, "a plurality of groups" means two or more groups (including two groups).

In the description of the present application, it should be noted that unless otherwise explicitly specified and defined, the terms "mounting", "connected", and "connection" should be understood in a broad sense. For example, "connected" or "connection" of mechanical structures can be a physical connection. For example, the physical connection can be a fixed connection, by means of, for example, a fixing member, such as a screw, a bolt, etc.; or the physical connection can be a detachable connection, for example, a mutual snap-fit or bayonet connection; or the physical connection can be an integral connection, for example, welding, bonding, or integral molding. In addition to a physical connection, "connected" or "connection" of circuit structures can be an electrical connection or a signal connection. For example, it can be a direct connection, that is, the physical connection, or an indirect connection by means of at least one intermediate element, as long as the circuits are connected. It can further be internal communication between two elements. In addition to a signal connection by means of a circuit, the signal connection can be a signal connection by means of a media medium, such as radio waves. For those of ordinary skill in the art, the specific meanings of the terms in the present application can be construed according to specific circumstances.

The materials mentioned in the embodiment of the present application may be raw materials used in a manufacturing process, such as acetylene black, manganese powder, zinc oxide powder and ammonium chloride used in traditional battery manufacturing, or cobalt lithium oxide, lithium manganate, lithium nickelate, lithium iron phosphate and graphite used in lithium-ion power battery manufacturing; or the raw materials may be common loading and unloading materials, such as flour, sugar, salt or other powdery or granular materials.

In a process of using the materials, it is often necessary to transfer the materials from one position to another position, for example, from a place where the materials are manufactured to a production workshop. In the process, the materials are often placed in material bags, so missing is less prone to occurrence. In the production workshop, if people want to use the materials, they need to take the materials out of the material bags. Due to a small volume, solid particles are very likely to hide in folds of the material bags or gaps of boxes without being found, such that workers or an unloading apparatus may ignore the solid particles during unloading of the materials, thus leaving some materials in the material bags at the end of unloading. The materials being left in the material bags not only wastes resources, but also increases the production cost. In addition, once the left materials enter an environment, such as a workshop, the materials may further cause pollution to other technological processes and affect the health of workers in the workshop.

At present, usually, a transporting apparatus transports material bags containing materials to a feed port of the production workshop, and then bottoms of the material bags are pierced, such that the materials fall out of openings at the bottoms and fall into the feed port so as to complete unloading. Some materials that are not easy to fall from the material bags are shaken to leave the material bags and fall into the feed port, but the method is not suitable for light materials.

Own gravity of the light materials is not enough to ensure that the light materials fall vertically without any external force, but the light materials are likely to drift around in a process of falling, such that the light materials cannot completely fall into the feed port. Moreover, since the light materials are usually small in volume, they are likely to hide in the folds of the material bags or in the gaps of the boxes. It is impossible to ensure that the light materials completely get out of the folds or gaps through limited shaking, and some materials hide in the folds or gaps, which may pollute an environment and affect the health of workers once the materials enter the environment.

In order to prevent the materials from entering the environment and then causing harm to the environment and human bodies, it is necessary to solve the problem of the materials being left at the end of unloading before the material bags are transferred. In view of this, an embodiment of the present application provides a suction gun. The suction gun provided in the embodiment of the present application may reduce materials left in material bags or boxes at the end of unloading.

The suction gun provided in the embodiment of the present application includes a gun head and an air blowing structure. The gun head is provided with material suction ports 1, and the material suction ports 1 are configured to suck materials located in an area for sucking. The air blowing structure includes an air blowing pipe 2 and air blowing holes 3 provided on a pipe wall of the air blowing pipe 2, and the air blowing holes 3 are configured to blow air flows so as to blow the materials to the material suction ports 1.

FIG. 1 is a schematic structural diagram of a suction gun provided in an embodiment of the present application from a first perspective. As shown in FIG. 1, the gun head of the suction gun is provided with the material suction ports 1, and there may be a plurality of material suction ports 1, such that a flow rate of sucked materials in unit time is increased. The plurality of material suction ports 1 form a material suction area, so as to suck materials at and close to the material suction ports 1. The air blowing holes 3 of the air blowing structure blow the air flows, the air flows blow the materials close to the suction gun to positions close to the material suction ports 1, and the materials are sucked through the material suction ports 1 from outside of the suction gun into inside of the suction gun, such that a wider range of materials may be sucked, and materials left in a material bag 7 or box may be reduced at the end of unloading.

The gun head has a hollow structure, such as a hollow hemisphere and a hollow cone. A side wall of the gun head is provided with through holes, that is, the material suction ports 1, the material suction ports 1 are configured to communicate an inner cavity of the gun head with an external environment, and the material suction ports 1 may be round, diamond-shaped, etc. The materials are sucked into the inner cavity from the outside of the gun head through the material suction ports 1, and unloading of the materials in the material bag 7 is completed.

It may be understood that the shape of the gun head and the shape of the material suction port 1 are not limited in the present application.

There may be one or more material suction ports 1. When there is one material suction port 1, a size of the material suction port 1 directly affects a flow rate of sucked materials in unit time. When there are a plurality of material suction ports 1, a flow rate of materials sucked by the suction gun in unit time is the total of flow rates of the plurality of material suction ports 1. It may be seen that for faster unloading, more material suction ports 1 are required.

The materials may move from a place where air pressure is high to a place where air pressure is low. Therefore, the air blowing holes 3 may blow air directly toward the material suction ports 1 in the vicinity of the material suction ports 1 and bring the materials to the material suction ports 1 by means of the air flows. Alternatively, the air blowing holes 3 may not blow air toward the material suction ports 1, so as to increase air pressure of an air flow passing area, such that an air pressure difference is generated between the air flow passing area and the material suction ports 1, and then the materials move to the material suction ports 1 through a siphonic effect. According to all the above methods, the air blowing holes 3 may blow the materials to the material suction ports 1.

According to the suction gun provided in the embodiment of the present application, the air blowing structure blows the materials to the material suction ports 1, materials away from the material suction ports 1 or at angles from which the material suction ports 1 inconveniently suck materials may be transferred to an area where the material suction ports 1 easily suck the materials, and the material suction ports 1 conveniently suck the materials, such that a wider range of materials may be sucked, so as to avoid the situation that the materials are left in the material bag 7 at the end of unloading.

Specifically, the air blowing pipe 2 may be provided with an air inlet 4, the air flow enters the air inlet 4 and is blown out from the air blowing holes 3, and the air inlet 4 provides an inlet for an air flow source of the air blowing holes 3.

In some embodiments, the air blowing pipe 2 is connected to the gun head.

For example, the air blowing pipe 2 may be bonded to the gun head, or may be used as an integral structure with the gun head through an integrated manufacturing process, or may further be fixed to the gun head through clamping, threaded bolts, etc., which is not limited in the embodiment of the present application.

The air blowing pipe 2 and the gun head form a whole, and the air blowing pipe 2 moves along with the gun head, that is, the air blowing pipe 2 moves along with the material suction ports 1 of the gun head, so as to ensure that the air flow blown from the air blowing pipe 2 may always blow the materials close to the gun head to the material suction ports 1, the material suction ports 1 conveniently suck the materials, and the materials left in the material bag 7 are reduced.

According to the suction gun provided in the embodiment of the present application, relative positions of the air blowing pipe 2 and the gun head are fixed, such that the air blowing pipe 2 may automatically move along with the movement of the gun head, time for adjusting a position of the air blowing pipe 2 when the gun head sucks the materials is saved, then the materials are sucked faster, and material suction efficiency is improved. In addition, since the positions of the air blowing pipe 2 and the material suction ports 1 are fixed, it may be ensured that the air blowing holes 3 of the air blowing pipe 2 always blow the materials to the material suction ports 1 in a material suction process, so as to reduce the materials left in the material bag 7.

In some embodiments, the pipe wall of the air blowing pipe 2 surrounds the gun head, and the air blowing holes 3 are located at one side of the air blowing pipe 2 close to the material suction ports 1.

Surrounding means that the pipe wall of the air blowing pipe 2 and the gun head surround the same axis. The pipe wall of the air blowing pipe 2 may surround the gun head, and alternatively, the pipe wall of the air blowing pipe 2 may be connected to one end of the gun head in a surrounding manner. Specifically, when the pipe wall of the air blowing pipe 2 and one end of the gun head are the same in shape and size, the end of the air blowing pipe 2 provided with the air blowing holes 3 may be bonded to one end of the gun head away from the material suction ports 1. For example, when the air blowing pipe 2 is a cylinder and the end of the gun head away from the material suction ports 1 is also a round pipeline, a pipe wall of one end of the air blowing pipe 2 provided with the air blowing holes 3 is bonded to a pipe wall of the round pipeline of the gun head, such that the pipe wall of the air blowing pipe 2 surrounds the gun head. When the pipe wall of the air blowing pipe 2 and one end of the gun head are the same in shape and the pipe wall of the air blowing pipe 2 is larger than one end of the gun head, the pipe wall of the air blowing pipe 2 may be fixed to an outer side of the gun head in a surrounding manner.

The air flows blown from the air blowing holes 3 gradually weaken in an airflow direction from outlets of the air blowing holes 3, and air pressure of the air flows at the outlets of the air blowing holes 3 is maximum. When the air blowing holes 3 are located at one side close to the material suction ports 1, it may be ensured that the air flows blown from the air blowing holes 3 may play their maximum roles and blow the materials to the material suction ports 1 more powerfully.

According to the suction gun provided in the embodiment of the present application, the air blowing holes 3 are provided at positions close to the material suction ports, so that the air flows blown from the air blowing holes 3 may be closer to the material suction ports 1, and the air pressure difference between the air flow passing area and the material suction port 1 is larger, such that the air blowing holes 3 may blow the materials toward the material suction ports 1 more efficiently, thus achieving a better air blowing effect, sucking into the suction gun the materials that are far away or inconvenient to suck, and reducing the materials left at the end of unloading.

In some embodiments, the gun head of the suction gun has an axis, there are a plurality of material suction ports 1, and the plurality of material suction ports 1 are provided around the axis of the gun head so as to suck the materials from a plurality of positions.

The plurality of material suction ports 1 may increase the speed of sucking materials, and the plurality of material suction ports 1 are provided around the axis of the gun head, which may ensure that each material suction port 1 is responsible for sucking the materials at different positions around the gun head, such that all-round suction of materials close to the gun head is ensured, and material missing in the material suction process is avoided, thereby preventing the materials from being left in the material bag 7 at the end of unloading.

According to the suction gun provided in the embodiment of the present application, the materials at various positions around the gun head are sucked, and different material suction ports 1 are used to suck the materials from different angles, which may allow the suction gun to suck the materials at more positions, so as to reduce the materials left at the end of unloading; and moreover, simultaneous suction of the plurality of material suction ports 1 may further increase a material flow rate in unit time and improve the material suction efficiency.

Figure 6:
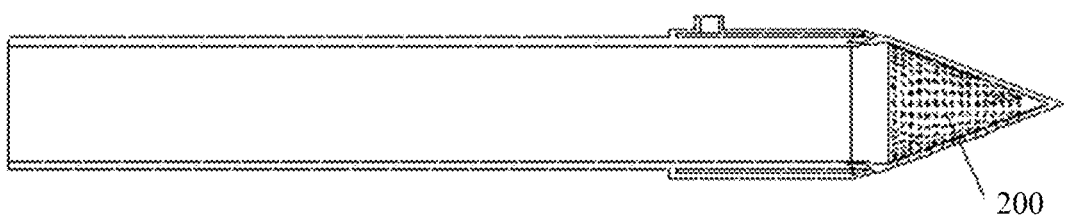
FIG. 6 is a schematic diagram of a suction gun provided in an embodiment of the present application.

In some embodiments, as shown in FIG. 6, the material suction ports 1 are fixedly provided with filter screens 200, and the filter screens 200 are provided with mesh holes to filter the materials.

The size of the material suction port 1 may be determined according to a particle size of the sucked material. One material suction port 1 may allow a plurality of materials or only one material to pass through at the same time. When only one material may pass through one material suction port 1 at a time, a filter screen may be fixed to an outer side of the material suction port 1. In this case, mesh holes of the filter screen should be smaller than the material suction port 1, such that larger materials may be filtered before blocking the material suction port 1. When a plurality of materials may pass through one material suction port 1 at a time, in order to prevent the suction gun from sucking impurities except for the materials, filter screens may be fixed to the material suction ports 1 so as to filter the sucked materials. The size of the mesh hole of the filter screen may be determined according to the size of the material. The filter screens and the material suction ports 1 cooperate with each other to filter the sucked materials for a second time, so as to ensure purity of finally sucked materials.

It may be understood that the purity of the materials according to the present application does not refer to the purity of own composition of the materials at a microscopic level, but refers to the purity of materials without impurities at a macroscopic level.

In addition, under the condition that a plurality of materials may pass through one material suction port 1 at a time, the filter screen may be provided inside the material suction port 1 or outside the material suction port 1, which is not limited in the embodiment of the present application.

According to the suction gun provided in the embodiment of the present application, the filter screens are fixed to the material suction ports 1, such that the sucked materials may be further filtered to prevent unqualified materials or other foreign matters from entering the material suction ports 1 and ensure the purity of the sucked materials.

In some embodiments, the air blowing pipe 2 and the gun head are coaxially arranged, there are a plurality of air blowing holes 3, and the plurality of air blowing holes 3 are provided at intervals around an axis of the gun head, so as to blow the materials to the material suction ports 1 from a plurality of positions.

Optionally, interval setting may be equal interval setting or unequal interval setting, may be symmetrical setting or asymmetrical setting, or may be array setting.

The air flows blown from the air blowing holes 3 provided at equal intervals have a fixed area, and the air flows share the materials around the gun head according to positions, such that mutual influence is small, and the situation that two air flows interfere with each other due to being too close to each other or cause material missing due to being too far away from each other is avoided.

In addition, equal interval setting, symmetrical setting and array setting all make processing more convenient.

The plurality of air blowing holes 3 may increase the efficiency of blowing the materials to the material suction ports 1, and the plurality of air blowing holes 3 are provided around the axis of the gun head, which may ensure that each air blowing hole 3 is responsible for blowing materials at different positions around the gun head to the material suction ports 1, such that the materials close to the gun head are blown to the material suction ports 1 in all directions, a material suction range of the gun head is expanded, and material missing in the material suction process is reduced, thereby avoiding the situation that the materials are still left in the material bag 7 or box at the end of unloading.

According to the suction gun provided in the embodiment of the present application, the plurality of air blowing holes 3 are provided at intervals around the axis of the gun head, and the materials at a plurality of positions around the gun head may be blown to the material suction ports 1 through different air blowing holes 3, such that the material suction ports 1 may be ensured to suck more materials around the gun head, so as to reduce the materials left.

In some embodiments, there is a second included angle α between an axis of each air blowing hole 3 and the axis of the gun head, and an angle value of the second included angle a is 60 degrees to 67.5 degrees, such that the accuracy of blowing the materials to the material suction ports 1 is improved.

Figure 2:
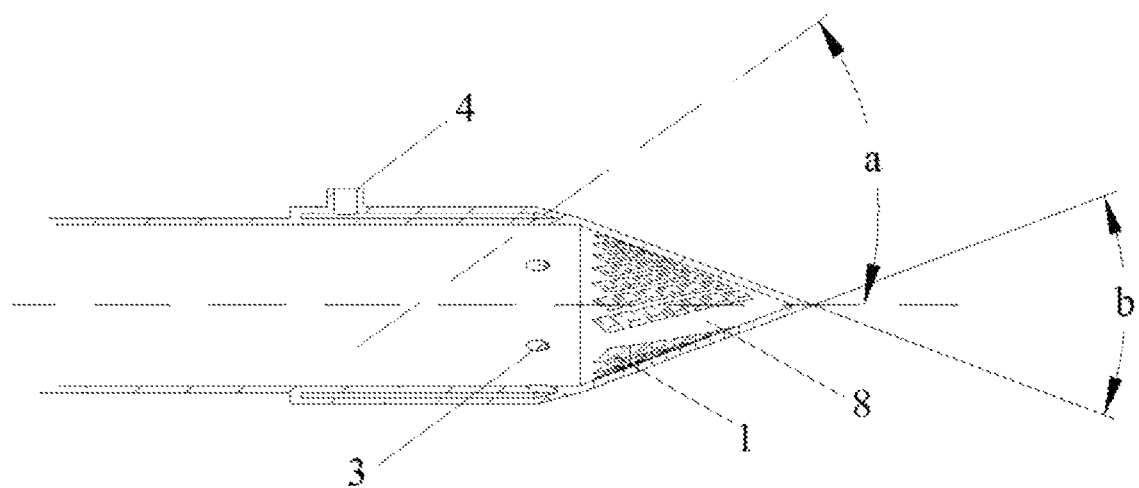
FIG. 2 is a schematic structural diagram of a section view of a suction gun provided in an embodiment of the present application.

FIG. 2 is a schematic structural diagram of a section view of a suction gun provided in an embodiment of the present application. As shown in FIG. 2, there is the second included angle a between the axis of each air blowing hole 3 and the axis of the gun head, and the second included angle a is smaller than 90 degrees. It may be understood that when an included angle between an air blowing direction of the air blowing hole 3 and a material suction direction of the material suction port 1 is too large, for example, an obtuse angle, it is difficult for the air blowing hole 3 to blow the material to the position of the material suction port 1, and it is easier to blow the material to an opposite end. Therefore, there must be an angle between the air blowing hole 3 and the material suction port 1 that enables the air blowing hole 3 to better blow the material to the material suction port 1.

In view of this, an embodiment of the present application provides an angle range, which may ensure a material blowing effect of the air blowing holes 3. Specifically, taking the axis of the air blowing holes 3 and the axis of the gun head as the reference, when the angle value of the second included angle α between the axis of the air blowing holes 3 and the axis of the gun head is 60 degrees to 67.5 degrees, it may be ensured that the air blowing holes 3 blow the materials to the front of the gun head, that is, the material suction ports 1 of the gun head.

If the second included angle α between the air blowing hole 3 and the gun head is too large, the materials may be blown away from the material suction ports 1; and if the second included angle a is too small, the materials close to the material suction ports 1 may be easily blown away, and it may be difficult to blow the materials to the material suction ports 1. Therefore, according to the suction gun provided in the embodiment of the present application, the angle value of the second included angle a is set as 60 degrees to 67.5 degrees, such that in air blowing directions, the air blowing holes 3 may be ensured to better blow the materials to the material suction ports 1, the materials left are reduced, and the material suction efficiency is improved.

As shown in FIG. 1, in some embodiments, the gun head is a cone or pyramid having a hollow structure, such that a tip of the gun head is used to pierce the material bag 7 containing the materials.

The tip refers to a top of the cone or the pyramid. In a geometric sense, an intersection of all generatrices of the cone or the pyramid is the tip of the cone or the pyramid.

The hollow structure may ensure that the material suction ports 1 of the gun head may suck more materials, and the top of the cone or the pyramid is pointed, which may ensure that the top of the gun head may be the tip capable of piercing the material bag 7, so that the material bag 7 may be directly pierced from outside of the material bag 7 and into the material bag 7 for material suction.

According to the suction gun provided in the embodiment of the present application, the structure of the gun head is set as the cone or the pyramid to ensure that the top of the gun head is the tip with a certain angle, such that the gun head may be used to directly pierce the material bag 7 containing the materials, and then a step of opening the material bag 7 before the gun head sucks the materials is omitted. In addition, an own structure of the gun head is used to pierce the material bag 7, and a size of an opening may be ensured to match a size of the gun head, such that a step of determining the size of the opening according to the size of the gun head is omitted, and leakage of the materials at the opening is avoided.

Figure 3:
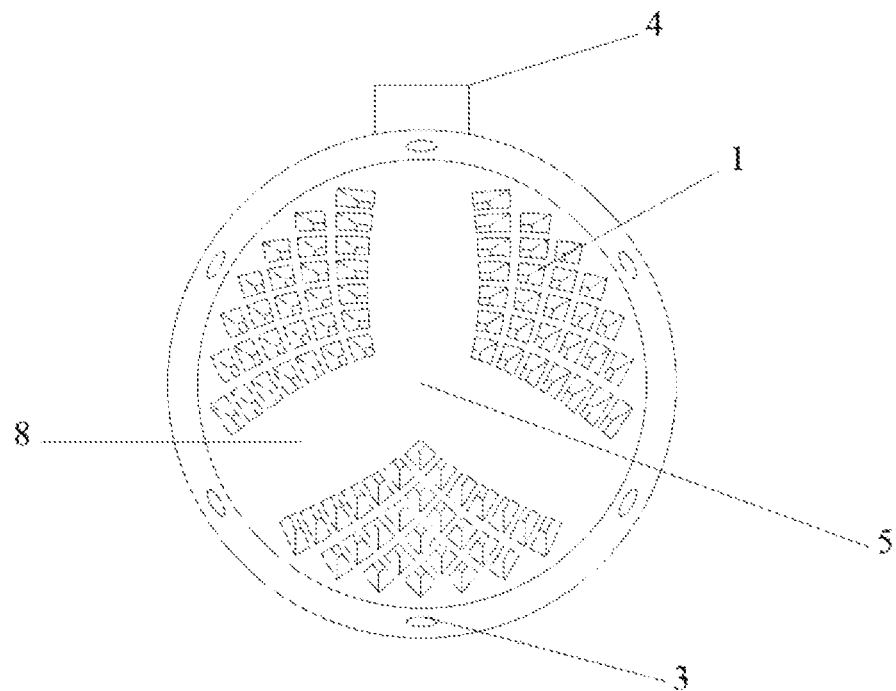
FIG. 3 is a schematic structural diagram of a suction gun provided in an embodiment of the present application from a second perspective.

FIG. 3 is a schematic structural diagram of a suction gun provided in an embodiment of the present application from a second perspective. As shown in FIG. 3, in some embodiments, the material suction ports 1 are provided on a conical surface of the cone or the pyramid, and the material suction ports 1 are not provided at the tip of the gun head so as to increase sharpness of the tip.

It may be understood that the material suction ports 1 are through holes provided on the conical surface of the gun head, and a structure of the conical surface with the material suction ports 1 is not as firm as a structure of an area of the conical surface without the material suction ports 1. Therefore, in one implementation, as shown in FIG. 1, 2, or 3, an area having a certain width from the tip of the gun head to the middle of the other end of the gun head may be set as a supporting area 8, so as to increase firmness of the structure of the gun head.

The material suction ports 1 are provided on the conical surface and are not provided on the tip of the gun head, such that the tip of the gun head may be a tip of the cone or the pyramid, a smaller contact area is achieved, a larger pressure intensity is obtained, and the gun head may pierce the material bag 7 more easily.

According to the suction gun provided in the embodiment of the present application, the material suction ports 1 are not provided on the tip of the gun head, such that a contact area between the tip of the gun head and the material bag 7 may be reduced, the gun head has a higher pressure intensity under the condition of the same force, and the material bag 7 may be successfully pierced with a smaller force.

In some embodiments, it may be seen from FIGS. 1 and 2 that the top of the gun head is a conical tip, and a vertex angle 5 of the conical tip has a first angle b.

In some embodiments, a value of b, that is, an angle value of a vertex angle 5 of the cone or the pyramid, is 30 degrees to 60 degrees, such that sharpness of the tip is kept, and an area of a material suction area formed by the material suction ports 1 is increased.

When the gun head is the cone, the vertex angle 5 refers to an intersection angle of two mutually symmetrical generatrices at the tip of the cone by taking an axis of the cone as the reference. When the gun head is the pyramid, the vertex angle 5 refers to an intersection angle of midlines of two mutually symmetrical sides at the tip of the pyramid by taking an axis of the pyramid as the reference.

When the vertex angle 5 is smaller than 30 degrees, the tip of the gun head may be very sharp, but meanwhile, a lateral area of the cone or the pyramid may be very small, such that an area where the material suction ports 1 may be arranged is limited, the area of the material suction area formed by the material suction ports 1 may decrease, and the area of the material suction area may directly affect the flow rate of the sucked materials in unit time. Therefore, when the vertex angle 5 is very small and smaller than 30 degrees, the material suction efficiency of the suction gun may also be obviously reduced.

When the vertex angle 5 is larger than 60 degrees, a lateral area of the cone or the pyramid may be very large, and an area where the material suction ports 1 may be arranged is large accordingly, such that the area of the material suction area formed by the material suction ports 1 may increase. However, the sharpness of the tip of the gun head may decrease, and the contact area between the tip of the gun head and the material bag 7 may increase, such that a pressure intensity obtained under the condition of the same force may decrease, and the material bag 7 may be pierced with a larger force. Moreover, due to reduction of the sharpness, the material bag 7 may be torn when the gun head pierces the material bag 7, which may easily lead to debris and other impurities at openings. The impurities may be adsorbed on the material suction ports 1 in the material suction process and then block the material suction ports 1, such that the material suction process is affected, the possibility of the materials being left is increased, and the material suction efficiency is reduced.

When the angle value of the vertex angle 5 at the top of the gun head is 30 degrees to 60 degrees, the top of the gun head is a sharp conical tip, such that the material bag 7 may be pierced quickly. Moreover, when the angle value of the vertex angle 5 is 30 degrees to 60 degrees, the lateral area of the cone or the pyramid may be further ensured, then the number of the material suction ports 1 and the area of the material suction area are ensured, and the materials may be sucked from more material suction ports 1 or a larger material suction area, such that the gun head may suck more materials in unit time, the materials left are reduced, and the material suction efficiency is ensured.

If the vertex angle 5 is too large, the sharpness of the tip may be reduced; and if the vertex angle 5 is too small, the area of the material suction area may be too small, which makes it difficult to suck the materials. According to the suction gun provided in the embodiment of the present application, the angle value of the vertex angle 5 at the tip of the gun head is set as 30 degrees to 60 degrees. The angle range is selected, and the sharpness of the tip and the area of the material suction area are also considered, so as to achieve balance therebetween, such that the area of the material suction area may be ensured while the tip of the gun head may be sharp enough to pierce the material bag 7, a wider range of materials may be sucked, the materials left are reduced, and the material suction efficiency is ensured.

In some embodiments, the angle value of the vertex angle 5 is 45 degrees. The larger an angle of the vertex angle 5 of the cone or the pyramid, the larger the area of the conical surface, but accordingly, the greater the force required by the tip to pierce the material bag 7, which means that large sharpness of the tip of the suction gun must be abandoned if the material suction area is desired to be large enough. In view of this, an embodiment of the present application provides an angle value, that is, when the angle value of the vertex angle 5 of the suction gun is 45 degrees, it may be ensured that not only the area of the material suction area is large enough, but also the tip of the suction gun is sharp enough to pierce the material bag 7 smoothly.

According to the suction gun provided in the embodiment of the present application, the angle value of the vertex angle 5 at the tip of the gun head is set as 45 degrees, and the area of the material suction area may be maximized, such that the material suction efficiency is maximized, and meanwhile, the sharpness of the gun head is also ensured, and then it is ensured that the material bag 7 may be successfully pierced with a smaller force.

Figure 4:
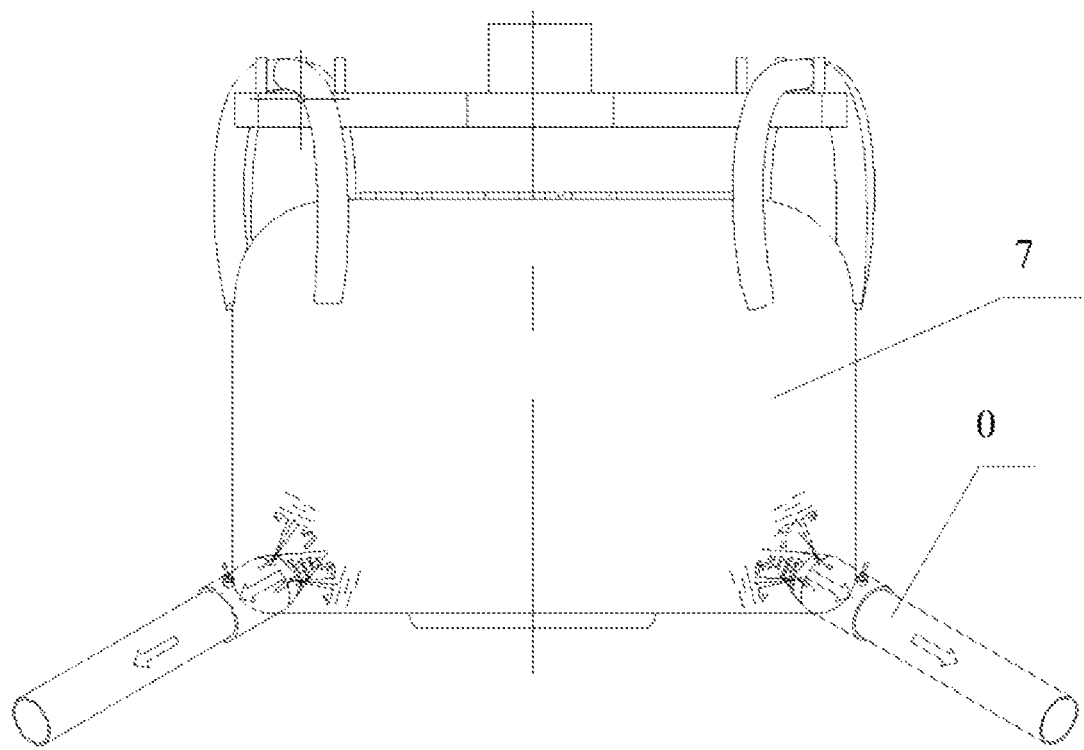
FIG. 4 is a schematic diagram of an application scenario of a material suction device provided in an embodiment of the present application.

In another embodiment of the present application, further provided is a material suction device. FIG. 4 is a schematic diagram of an application scenario of a material suction device provided in an embodiment of the present application. As shown in FIG. 4, a material suction device provided in the embodiment of the present application may be provided at the bottom of a material bag 7, and the present application does not limit the number of material suction devices used in one material suction process. It may be understood that the more material suction devices provided at the bottom of the material bag 7, the faster the material suction, and the higher the material suction efficiency.

Figure 5:
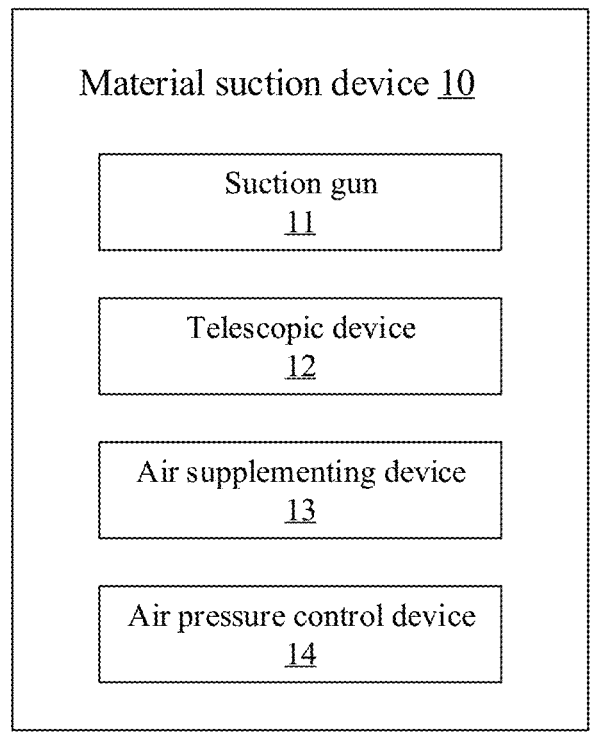
FIG. 5 is a schematic diagram of a material suction device provided in an embodiment of the present application.

As shown in FIG. 5, the material suction device 10 provided in the embodiment of the present application may include:

at least one suction gun 11 according to any one of the embodiments, a telescopic device 12 configured to control the suction gun 11 to move such that the suction gun 11 moves close to materials, and an air supplementing device 13 configured to feed air into an air blowing pipe 2 of the suction gun 11. The telescopic device 12 controls the suction gun 11 to move, such that the suction gun 11 may reach any position to suck the materials. The air supplementing device 13 continuously supplies an air source to air blowing holes 3, such that the air blowing holes 3 may continuously blow the materials to material suction ports 1. The material suction ports 1 also continuously suck the materials, such that the suction gun 11 sucks the materials close to a gun head more thoroughly under the cooperation of the air blowing holes 3 and the material suction ports 1, and the materials left in the material bag 7 are reduced.

For example, as shown in FIGS. 1, 2, 3, and 5, the air supplementing device 13 is configured to feed air into the air blowing pipe 2 through an air inlet 4, and the air comes out from the air blowing holes 3 of the air blowing pipe 2, so as to form air flows to blow the materials.

According to the material suction device provided in the embodiment of the present application, the telescopic device 12 may control the suction gun 11 to move close to the materials at the beginning of material suction and move away from the materials at the end of material suction. In addition, the suction gun 11 may be further controlled to expand and contract accordingly in a material suction process, so as to suck the materials from proper positions, and the air supplementing device 13 is configured to feed air into the air blowing pipe 2 in the material suction process, so as to make the air flow out from the air blowing holes 3 and blow the materials to the material suction ports 1 of the gun head, thereby ensuring that the materials are sucked by the material suction ports 1, and the materials left in the material bag 7 are reduced while the material suction efficiency is improved.

In some embodiments, as shown in FIG. 5, the material suction device 10 provided in the embodiment of the present application may further include:

an air pressure control device 14 configured to control air pressure inside the suction gun 11 to be lower than air pressure outside the suction gun 11, such that the materials outside the suction gun 11 are sucked into the suction gun 11 from the material suction ports 1. The air pressure control device 14 may be an air amplifier or an air suction device that generates suction. It may be understood that the materials may be blown to the material suction ports 1 due to a siphonic effect generated by the air flows blown from the air blowing holes 3, and the air pressure control device 14 generates air pressure inside the suction gun 11 that is lower than air pressure outside the suction gun 11, such that the material suction ports 1 may actively suck the materials blown by the air blowing holes 3.

According to the material suction device 10 provided in the embodiment of the present application, the air pressure control device 14 may enhance an air pressure difference between inside and outside of the suction gun 11, and the materials outside the suction gun 11 may be sucked into the suction gun 11, such that a material suction effect is ensured, and the materials left are reduced.

In some embodiments, the material suction device provided in the embodiment of the present application may further include:

a pipeline 6, which is located inside the air blowing pipe 2, connected to one end of the suction gun away from the material suction ports 1, and configured to transport the materials sucked by the suction gun. The materials sucked by the suction gun need to be transferred to another position. The pipeline 6 configured to transfer the materials may be determined according to properties of the materials. The pipeline 6 may be made of metal or nonmetal. The material and hardness of the pipeline 6 are not limited in the present application.

According to the material suction device provided in the embodiment of the present application, the other end of the suction gun may be connected to the pipeline 6, such that the materials sucked by the suction gun are received and transferred through the pipeline 6. For example, as shown in FIG. 1, in the material suction device, one end of the gun head away from the material suction ports 1 is connected to one pipeline 6, such that the materials sucked by the material suction ports 1 are received, and a place where the pipeline 6 leads is a place where the sucked materials are to be transferred.

The material suction device provided in the embodiment of the present application may be applied in the case of transferring the materials contained in the material bag 7. For example, with a battery processing process as an example, before battery processing is started, it is necessary to prepare required powder, and then add the powder to a stirring production workshop according to a certain ratio for stirring. Generally, the powder is transported and loaded in a ton bag, and ton bag loading is a crucial link.

The material suction device provided in the present application may be applied to an unpacking station of a workshop, inside of the unpacking station is vacuum, and the material suction device provided in the present application may be placed at a bottom corner of the unpacking station.

When the ton bag is placed in the unpacking station, the telescopic device in the material suction device at the bottom of the unpacking station may control the suction gun to move upward, and the tip of the suction gun pierces the ton bag and continues to move until the gun head is inserted into the ton bag. Then, the air blowing holes 3 and the material suction ports 1 start to play their roles, the air blowing holes 3 may further blow the powder hidden in the ton bag to the material suction ports 1, the material suction ports 1 keep sucking the materials, and the air blowing holes 3 and the material suction ports 1 cooperate with each other until the powder in the ton bag is completely sucked.

To sum up, the suction gun provided in the embodiment of the present application may suck the materials more thoroughly through the cooperation between the air blowing holes 3 and the material suction ports 1, such that the problem of the materials being left in the material suction process is solved, and the material suction efficiency is improved. The material suction device provided in the embodiment of the present application may control the suction gun to move to a material suction position, and supplement the air blowing holes 3 of the suction gun with gas, so as to provide an air flow source of the air blowing holes 3, such that air blowing may be conducted all the time in the material suction process. The material suction device provided in the present application may further make the air pressure inside the suction gun be lower than the air pressure outside the suction gun, such that the materials outside the suction gun may be sucked into the suction gun so as to achieve a material suction function.

Those skilled in the art should understand that, although some of the embodiments herein include some but not other features included in other embodiments, the combination of the features of different embodiments means being within the scope of the present application and forms different embodiments. For example, in the claims, any one of the claimed embodiments can be used in any combination.

In conclusion, the above embodiments are merely used for illustrating rather than limiting the technical solutions of the present application. Although the present application has been illustrated in detail with reference to the above embodiments, it should be understood by those of ordinary skill in the art that modifications can still be made to the technical solutions described in the foregoing embodiments, or equivalent substitutions of some technical features thereof are also possible; and while these modifications or substitutions do not make the essence of the corresponding technical solutions depart from the spirit and scope of the technical solutions of the embodiments of the present application.

What is claimed is:

1. A suction gun, comprising:
a gun head, wherein the gun head is provided with a plurality of material suction ports, the plurality of material suction ports are configured to suck a material located in an area for sucking, and the plurality of suction ports are diamond-shaped and for sucking the material from a plurality of positions in the area outside of the suction gun into inside of the suction gun; and
an air blowing structure comprising an air blowing pipe and an air blowing hole provided on a pipe wall of the air blowing pipe, wherein the air blowing hole is configured to blow an air flow so as to blow the material to the area for sucking.

2. The suction gun according to claim 1, wherein the air blowing pipe is connected to the gun head.

3. The suction gun according to claim 2, wherein the pipe wall of the air blowing pipe surrounds the gun head, and the air blowing hole is located at one side of the air blowing pipe close to the plurality of material suction ports.

4. The suction gun according to claim 1, wherein the plurality of material suction ports are provided around an axis of the gun head.

5. The suction gun according to claim 1, wherein that the plurality of material suction ports are provided with a filter screen, and the filter screen is provided with mesh holes to filter the material.

6. The suction gun according to claim 1, wherein:
the air blowing pipe and the gun head are coaxially arranged; and
the air blowing hole is one of a plurality of air blowing holes provided at intervals around an axis of the gun head, so as to blow the material to the area for sucking.

7. The suction gun according to claim 1, wherein an included angle between an axis of the air blowing hole and an axis of the gun head is in a range from 60 degrees to 67.5 degrees.

8. The suction gun according to claim 1, wherein the gun head is a cone or a pyramid having a hollow structure, and a tip of the gun head is configured to pierce a material bag containing the material.

9. The suction gun according to claim 8, wherein the plurality of material suction ports are provided on a conical surface of the cone or the pyramid, and no material suction port is provided at the tip of the gun head.

10. The suction gun according to claim 8, wherein an angle value of a vertex angle of the cone or the pyramid is in a range from 30 degrees to 60 degrees.

11. The suction gun according to claim 10, wherein the angle value of the vertex angle is 45 degrees.

12. A material suction device, comprising:
a suction gun comprising:
a gun head, wherein the gun head is provided with a plurality of material suction ports, the plurality of material suction ports are configured to suck a material located in an area for sucking, and the plurality of suction ports are diamond-shaped and for sucking the material from a plurality of positions in the area outside of the suction gun into inside of the suction gun; and
an air blowing structure comprising an air blowing pipe and an air blowing hole provided on a pipe wall of the air blowing pipe, wherein the air blowing hole is configured to blow an air flow so as to blow the material to the area for sucking;
a telescopic device, wherein the telescopic device is configured to control the suction gun to move; and
an air supplementing device, wherein the air supplementing device is configured to feed air into the air blowing pipe of the suction gun.

13. The material suction device according to claim 12, further comprising:
an air pressure control device, wherein the air pressure control device is configured to control air pressure inside the suction gun to be lower than air pressure outside the suction gun.

* * * * *